June 7, 1966  E. GOTTESMANN  3,254,560
OPTICAL METHOD FOR POSITIONING A WORKPIECE
Filed Dec. 3, 1962  3 Sheets-Sheet 1

INVENTOR.
Emanuel Gottesmann
BY
Arthur A. March
ATTORNEY

June 7, 1966  E. GOTTESMANN  3,254,560
OPTICAL METHOD FOR POSITIONING A WORKPIECE
Filed Dec. 3, 1962  3 Sheets-Sheet 2
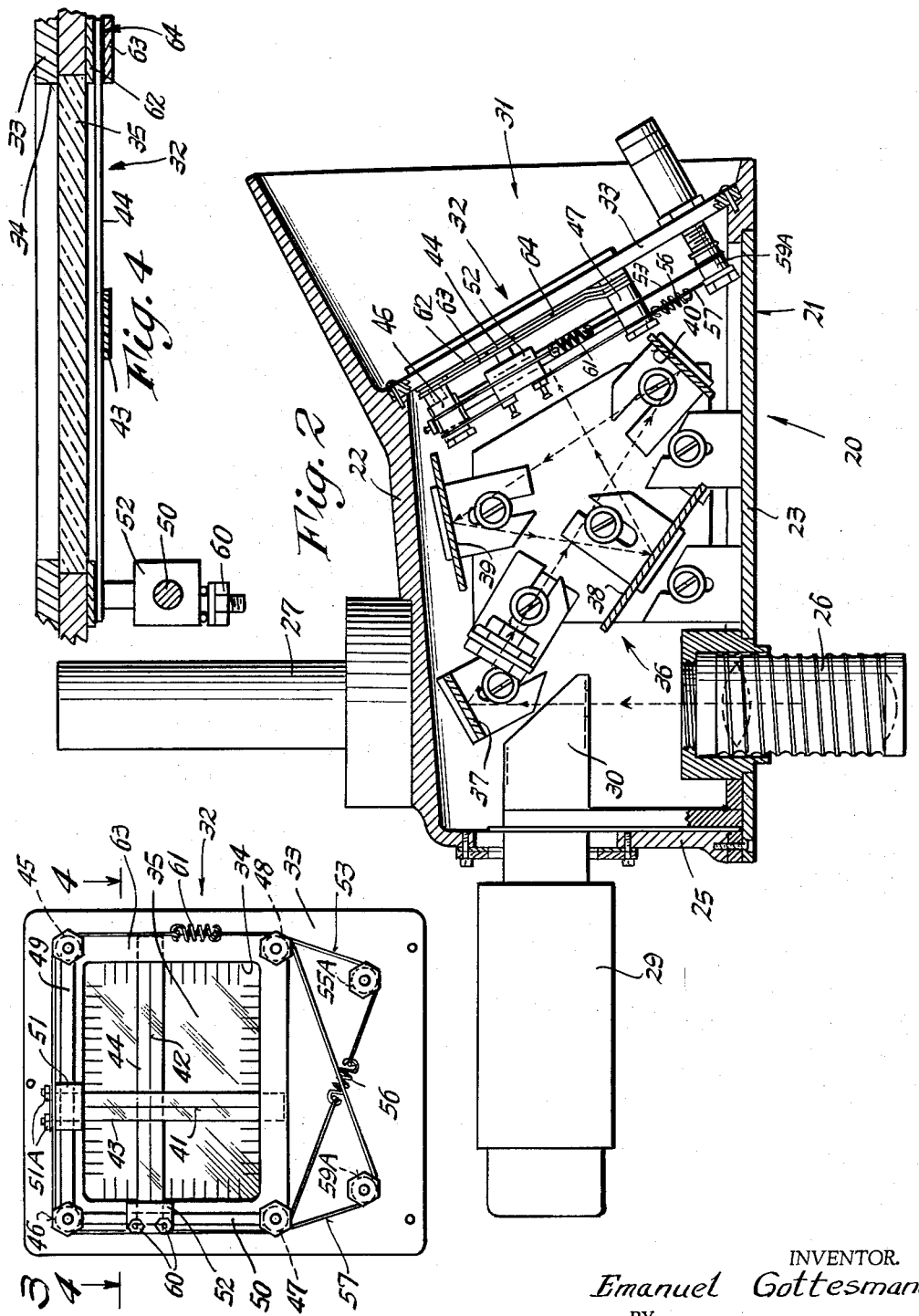
INVENTOR.
Emanuel Gottesmann
BY
Arthur A. March
ATTORNEY June 7, 1966   E. GOTTESMANN   3,254,560
OPTICAL METHOD FOR POSITIONING A WORKPIECE
Filed Dec. 3, 1962   3 Sheets-Sheet 3

INVENTOR.
Emanuel Gottesmann
BY
Arthur A. March
ATTORNEY

United States Patent Office 3,254,560
Patented June 7, 1966

3,254,560
OPTICAL METHOD FOR POSITIONING A
WORKPIECE
Emanuel Gottesmann, 45 E. 9th St., New York 3, N.Y.
Filed Dec. 3, 1962, Ser. No. 241,996
2 Claims. (Cl. 88—24)

This invention relates in general to a method of operating an optical instrument and more specifically to an optical method for aligning a workpiece for use in the machine tool industry.

Machining of precision work requires the accurate positioning of the workpiece with respect to the operating tool. Such accurate position of the workpiece can be a tedious and time consuming task, requiring of the operator much skill and experience. Even with the exercise of extreme care and skill, the degree of accuracy obtainable, at best, can be only as good as the machine, for every machine spindle is affected by runout. For this reason, the use of optics provides for the most accurate and quickest method for properly locating a workpiece, for locating holes and contours in machining a workpiece, or for the inspection of a machined workpiece.

By the use of an optical aid, a skilled tool maker is relieved of a time consuming and awkward mechanical means of location and the tedious repetition of steps for the inspection of the machined part. The precise and quick approach afforded by an optical aid further allows the work to be easily accomplished even by an operator of nominal skill.

Therefore, an object of this invention is to provide a method of using an optical instrument with a viewing screen in which the instrument reference lines and the projected image of a workpiece target reticle can be readily viewed by the machine operator.

Another object of this invention is to provide an improved method for operating an optical centerscope in which the reference lines thereof are rendered readily adjustable to facilitate and expedite the centering of the instrument.

A further object is to provide an expedient method of finding the spindle center for exact location of a workpiece with reference thereto.

In accordance with this invention, the foregoing objects and other features and advantages are obtained by an optical centerscope comprising essentially a housing having a lens system in which there is disposed a series of reflecting surfaces for projecting a magnified image of the target sighted by the lens assembly onto a screen located at the front of the housing.

An important aspect of this invention resides in a pair of preferably intersecting or crossing reference lines associated with the screen together with means for rendering each of the respective reference lines individually adjustable across the entire width of the screen. A spindle disposed in axial alignment with respect to the center line of the lens assembly is connected to the centerscope housing, and provides the means by which the centerscope may be connected to a machine part.

A feature of this invention resides in the provision that the optical centerscope is provided with a large screen on which a magnified projector image of an observed edge, center point, or other marking on the work piece is projected, and which image is free of parallax and easily viewed from a normal working position from the front of the machine. With the use of the present invention, the operator of the centerscope need not position himself extremely close to the machine to see the image as was heretofore the case when using customary monocular devices.

Another feature resides in the provision of the two adjustable hair lines so that the centerscope of this invention can be easily centered and positioned on radical drills, boring machines, lathes and the like.

Another feature resides in the provision of reference lines which when adjusted facilitate rapid centering to an accuracy of .0002 inch.

Still another feature resides in the provision that the instant centerscope permits the lining-up of workpieces and fixtures on machine tables taking care of both spindle eccentricity and instrument alignment at the same time.

Still another feature resides in the provision that the centerscope of this invention may be utilized as a means to effect optical transfer of reference points from a master, template or drawing to a workpiece in a reliable and accurate manner by the use of a side arm attachment.

Other features and advantages will become more readily apparent when considered in view of the drawings and the following description in which:

FIG. 2 is a sectional side view of the centerscope of this invention.

FIG. 3 is a rear view detail of the screen assembly of the instant centerscope.

FIG. 4 is a sectional view taken along line 4—4 of FIG. 3.

Figure 1:
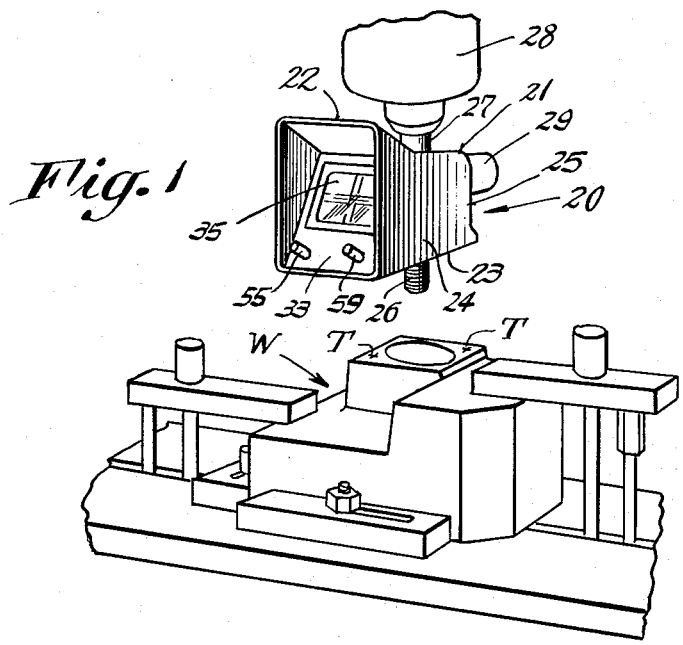
FIG. 1 is a perspective view illustrating the optical centerscope of this invention in position to locate a reference point on a workpiece disposed on the bed of the machine.
Figure 5:
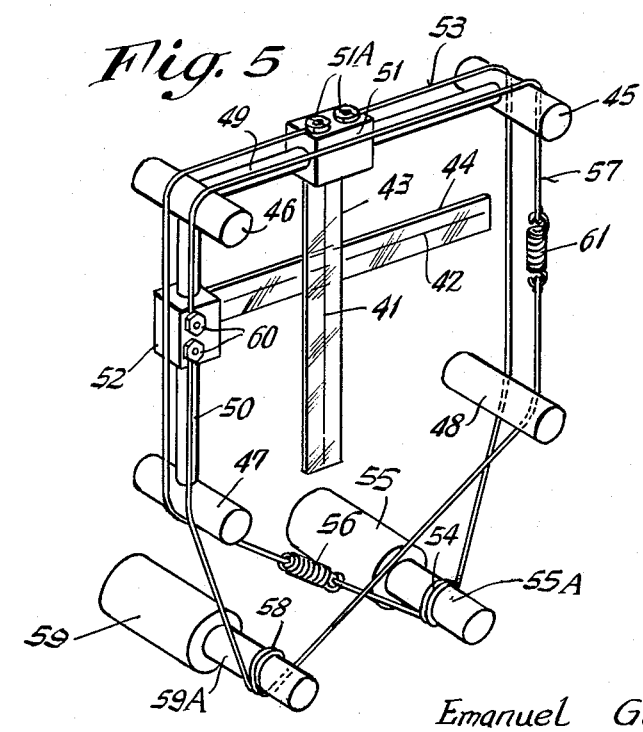
FIG. 5 is a diagrammatic perspective view of the reference cross hairs utilized in conjunction with the screen assembly together with the means by which the cross hairs are rendered adjustable.

Referring to the drawings, FIGS. 1 to 5 illustrate the centerscope 20 of the instant invention. It comprises essentially a housing 21 which is defined by a top wall 22, a bottom wall 23, and opposed connecting side walls 24, and a rear wall 25. Connected to the bottom wall 23 is a lens assembly 26 for sighting the target or reference points T on the workpiece W. See FIG. 1. In coaxial alignment with the lens assembly 26 and connected to the top wall 22 is the mounting spindle 27 by which the centerscope 20 of the instant invention is attached to a chuck, collet or the like of a lathe, radial drill, boring mill or other similar machine tool 28. A light source 29 for illuminating the target T is mounted on the rear wall 25 of the housing, the rays or beams of light being directed by a prismatic lens 30 positioned within the housing.

At the front portion 31 of the housing is a screen assembly 32 which is detachably connected thereby by suitable screw fasteners. This screen assembly 32 comprises a screen mounting plate 33 having a rectangular cut-out portion 34 therein sized to accommodate the screen 35. Disposed within the housing between the objective lens assembly 26 and the screen 35, is an optical system 36 for projecting a magnified image of the target T sighted by the lens assembly 26 onto the screen 35. The optical system 36 includes a series of mirrors 37, 38, 39 and 40, for reflecting the image in the manner indicated in FIG. 1. Each of the mirrors is connected to a suitable bracket means by which each mirror may be adjusted with respect to each other.

In accordance with this invention, the screen assembly 32 includes a pair of adjustable reference lines 41 and 42 which are each arranged so that they may be adjusted or moved across the entire width of the screen 35. In the illustrated embodiment, the reference lines 41, 42 are arranged to intersect or cross each other at right angles, and each reference line 41 and 42 comprises a hair line fixed to an appropriate slide 43 and 44, respectively.

Each of the reference line slides 43, 44 is mounted so as to be rendered adjustable along a transverse axis of the screen 35. To render the slides 43, 44 adjustable, there is connected to the mounting plate 33 adjacent each corner of the screen 35 a guide member in the form of posts or pins 45, 46, 47 and 48, or the like, which extend inwardly of the housing. Between pins 45 and 46 and extending along a horizontal length of the screen 35 there is connected a slide bar or rod 49. Another slide bar or rod 50 is connected along the height of the screen between guide pins 46 and 47. Slidably mounted on each of the slide bars or rods 49, 50 are sliders 51 and 52, respectively. Sliders 51 and 52, in turn, have connected thereto the vertical and horizontal cross hair slides 43 and 44, respectively.

The means for actuating or moving the respective cross hair slides 43, 44 across the screen 35 to effect adjustment thereof comprises a cable or string loop. For example, the means for adjusting the position slide 43 containing the vertical cross hair 41 for effecting horizontal movement thereof comprises a closed loop 53 which is threaded over the respective guide pins 45, 46, 47, and 48, with the upper leg or segmental portion of the loop fixed to slider 51 by fasteners 51A. An intermediate portion of the drive loop 53 is coiled or wound several times, as at 54, about a spindle 55A of a control knob 55, so that rotation of the knob 55 in one direction or the other will effect movement of the vertical cross hair 41 horizontally across the screen 35. To maintain the loop or cable 53 taut, the ends of the cable or loop 53 may be connected to the opposed end of a tensioning spring 56. A similar loop drive 57 is provided for vertically adjusting the horizontal cross hair slide 43. As shown, the loop or cable 57 of the horizontally disposed, vertically movable cross hair 41 is likewise threaded over the respective guide pins 45, 46, 47 and 48, and it has a portion thereof wound or coiled several times at an intermediate point thereof as indicated at 58, about the spindle 59A connected to adjusting knob 59. A segmental portion of the cable 57 is fixed to slider 52 by fasteners 60, and a tensioning spring 61 is also connected between the ends thereof to maintain cable loop 57 taut. Thus, as the knob 59 is rotated in one direction or the other, the horizontal cross hair 42 is moved in a vertical direction throughout the height of the screen 35.

While the guide pins 45–48 are shown for illustrative purposes as having a relatively smooth surface, it will be understood that grooves or threads may be provided on the surface of such pins to accommodate the cable loops 53 and 57 and maintain them in axial alignment preventing slide slippage.

To guide the free ends of the respective cross hair slides 43, 44, a pair of coaxially aligned guide frames 62, 63 are secured to the rear of the screen 35 to define a trackway 64 therebetween for receiving the free ends of the respective cross hair slides, as shown in FIG. 2.

The centering procedure of the centerscope described is as follows:

The spindle of the centerscope is positioned within the chuck of a machine element 28, as seen in FIG. 1.

Referring now to FIGS. 6 to 11, which illustrate the successive steps in the procedure to be described, it will be noted that screen 35 of the instrument, its reference lines, and the target recticle are diagrammatically illustrated. In FIGS. 6 to 11, the adjustable cross hairs 41, 42 of the instrument 20 are depicted on the face of the screen 35 as continuous black lines whereas the target reticle T and the image thereof projected on the screen are depicted by short dash or broken lines.

Figure 6:
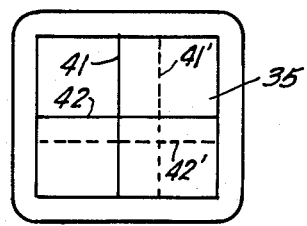

To start the procedure, the instrument screen 35 is directed toward the front of the machine and the target reticle thereon is positioned beneath the instrument, as seen in FIG. 6. With the instrument 20 thus disposed, the target reticle T is rotated slightly until the projected image of the reticle on the screen becomes parallel with the instrument hair lines 41, 42 as shown in FIG. 6. At this point, it is immaterial that the intersection of the hair lines 41, 42 is not coincident with the center of the projected target reticle.

Figure 7:
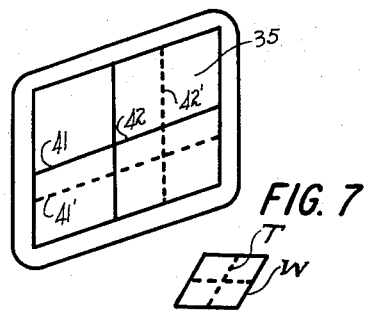
Figure 8:
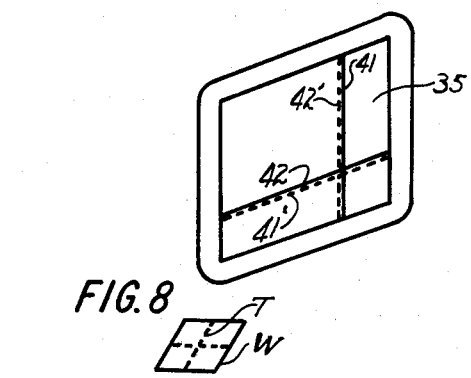

The next step of the procedure includes rotating the machine tool spindle and with it the instrument so that it is disposed at right angles or 90° to the right, with respect to the former position as seen in FIG. 7. In this position, the reference lines 41, 42 and the cross lines 41' and 42' of the reticle T remains parallel but with different centers. With the instrument thus disposed, the respective instrument hair lines 41, 42 are adjusted by operating the respective adjustable control knobs 55, 59 to a position where the reference lines 41, 42 coincide with the projected image of the reticle 41' and 42' on screen 35, as shown in FIG. 8. It will be noted that the cross lines of the target reticle image 41' and 42' projected on the screen are slightly off center with respect to the hair lines 41 and 42, for illustrative purposes only. However, in practice, hair lines 41, 42 are actually adjusted to coincide with the reticle image.

Figure 9:
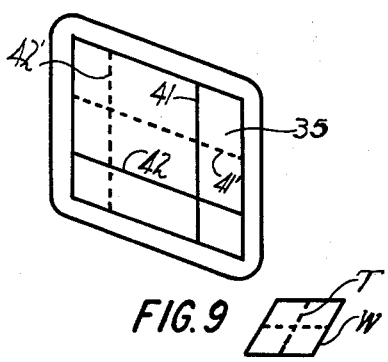

The next step of the procedure is to rotate the instrument so that it is disposed 180° to the left, as viewed in FIG. 9. At exactly 180° the image of the cross lines 41' and 42' of the image target reticle T and the reference hair lines 41, 42 of the instrument will be parallel to each other but with different center positions.

Figure 10:
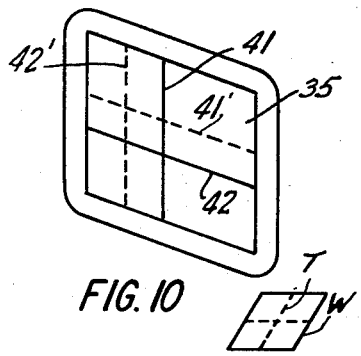
FIGS. 6 to 13 illustrate the relative positions of the centerscope screen and its reference lines with respect to a target reticle in each of the several succeeding steps required for effecting the alignment procedure of the instant centerscope.

With the instrument in this position, the instrument hair lines 41, 42 are respectively adjusted or moved to exactly one-half the distance between the projected image cross lines 41' and 42' and the former position of the hair lines. Care should be taken that the reticle target is not moved during this operation. The half-way adjustment of the respective hair lines 41, 42 is illustrated in FIG. 10.

Figure 11:
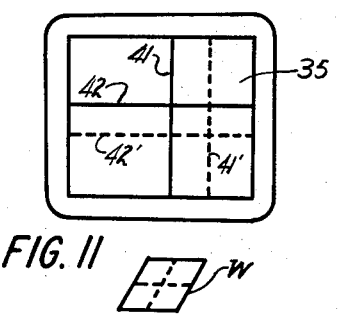

The instrument is again rotated to the right 90° so that the screen is again disposed in its original front position as viewed in FIG. 11. In this position, the cross lines of the projected target reticle 41' and 42' and the hair lines 41, 42 of the instrument will again be parallel to each other.

Figure 12:
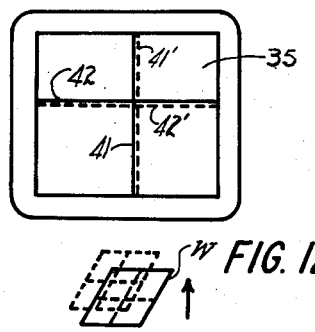

The next step of the alignment procedure is to move the machine tool table containing the target reticle T, as seen in FIG. 12, so that the projected target reticle image 41' and 42' coincides with the instrument hair lines 41, 42. Care must be taken not to move the instrument hair lines 41, 42 from the adjusted position of FIG. 10 during this step.

Figure 13:
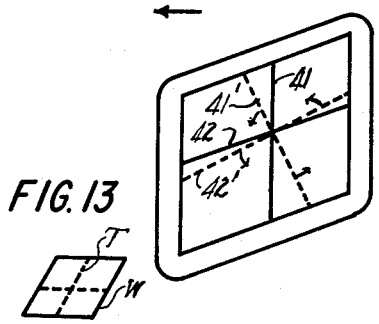

With the completion of this last step, the centering of the centerscope is completed. However, in order to check the centering, the instrument 20 may be rotated either to the left or right. If perfect alignment has been attained, the image of the reticle cross lines 41' and 42' will appear to rotate in the direction of the arrows exactly on the center of the instrument cross hairs 41, 42 as seen in FIG. 13.

From the foregoing description, it is readily apparent that the instant centerscope is relatively simple in construction and easy to use. The means provided by the present invention accomplish in a relatively simple manner the attainment of the projection of the center line of the machine tool spindle onto the work piece. This center line is readily ascertainable at the crossing of the adjustable references lines over the projected image of the target reticle.

It will be understood that the foregoing description of the present invention refers to a particular method for obtaining the center line and that this particular embodiment is for illustrative purposes only. The details described are to be in no way construed as limiting the present invention for modifications and variations may be made without departing from the spirit of the invention or the scope of the appended claims.

I claim:
1. A method of locating the center of a machine tool comprising the steps of:
- (a) positioning an optical instrument having movable reference lines in tool holder of a machine so that the axis of the instrument is coincidental with the axis of the holder,
- (b) placing a target reticle beneath the optical instrument,
- (c) rotating the target reticle slightly so that the image of the projected target reticle and the reference lines of the instrument are parallel to each other,
- (d) rotating the instrument approximately 90° in one direction with respect to said target reticle and adjusting the reference lines of the instrument to coincide with the projected image of the target reticle,
- (e) rotating the instrument approximately 180° in the opposite direction,
- (f) adjusting the position of the instrument reference lines to one-half the distance between the projected image of the target reticle and the former position of said reference lines,
- (g) rotating the instrument in said one direction 90°,
- (h) and repositioning the target reticle so that the projected image of the target reticle coincides with the reference lines of the instrument.

2. The invention as defined in claim 1, and including the step of
- (a) checking the alignment by rotating the instrument with respect to the target reticle whereby the image of the target reticle will rotate about the center of the cross hairs of the instrument upon correct alignment.

References Cited by the Examiner

UNITED STATES PATENTS

| | | | |
|---|---|---|---|
| 2,145,116 | 1/1939 | Howard | 88—24 |
| 2,444,639 | 7/1948 | Elder | 88—24 |
| 2,481,551 | 9/1949 | Williams | 88—1 |
| 2,580,674 | 1/1952 | Griffin | 88—14 X |
| 2,922,333 | 1/1960 | Subach et al. | 88—24 |
| 2,933,013 | 4/1960 | Baker et al. | 88—24 |
| 3,130,633 | 2/1961 | Rantsch | 88—14 X |

NORTON ANSHER, *Primary Examiner.*

WILLIAM MISIEK, *Examiner.*

R. D. MUHL, VANCE A. SMITH, *Assistant Examiners.*